US009823685B2

(12) United States Patent
Bledsoe et al.

(10) Patent No.: US 9,823,685 B2
(45) Date of Patent: Nov. 21, 2017

(54) ACCELERATION AND BRAKING MECHANISM KIT FOR A VEHICLE

(71) Applicant: Ford Global Technologies, LLC, Dearborn, MI (US)

(72) Inventors: Jeffry Michael Bledsoe, Shelby Township, MI (US); Darin R. Billot, Snover, MI (US); Joseph Kinney, Columbus, MI (US); Jack Duncan, Metamora, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 14/562,964

(22) Filed: Dec. 8, 2014

(65) Prior Publication Data

US 2016/0161974 A1 Jun. 9, 2016

(51) Int. Cl.
*B62D 1/24* (2006.01)
*G05G 1/54* (2008.04)

(52) U.S. Cl.
CPC .................................... *G05G 1/54* (2013.01)

(58) Field of Classification Search
CPC .. G05G 1/54; G05G 1/46; G05G 1/34; G05G 1/36; G05G 1/01; B60K 26/02; B60K 26/00; B60K 26/04
USPC ..... 74/501.5 R, 501.5 H, 512, 513, 514, 560
See application file for complete search history.

(56) References Cited

U.S. PATENT DOCUMENTS 2,724,285 A * 11/1955 Lerman ................ B60W 30/18 477/209
2,777,335 A * 1/1957 Engberg ................ B60K 26/02 477/209
3,713,332 A * 1/1973 Herrbrich ......... G01M 17/0074 73/116.06
3,812,750 A * 5/1974 Meyer ...................... B60T 7/16 188/106 P (Continued)

FOREIGN PATENT DOCUMENTS

| | | |
|---|---|---|
| JP | 4198538 | 10/2008 |
| JP | 5435691 | 3/2014 |
| KR | 101283357 | 7/2013 |

OTHER PUBLICATIONS

GB Search Report dated Mar. 30, 2016 (4 pages).

(Continued)

*Primary Examiner* — James M Dolak
(74) *Attorney, Agent, or Firm* — Frank A. MacKenzie; Bejin Bieneman PLC

(57) ABSTRACT

An acceleration and braking mechanism kit autonomously controls a vehicle brake pedal and a vehicle accelerator pedal. The kit includes a support bracket and bell crank supported on the support bracket for connection with an acceleration pedal or a brake pedal of the vehicle. An actuator is connected to the bell crank for moving the bell crank. A first base bracket is configured to mount to a first vehicle. A second base bracket is configured to mount to a second vehicle. The first base bracket and the second base bracket each include a mounting feature. The support bracket includes a mounting base alternately engageable with the mounting feature of the first base bracket and the mounting feature of the second base bracket such that the support bracket may be mounted to the first base bracket in (Continued)

the first vehicle or to the second base bracket in the second vehicle.

18 Claims, 6 Drawing Sheets

(56) References Cited

U.S. PATENT DOCUMENTS

| | | | | | |
|---|---|---|---|---|---|
| 4,546,667 | A * | 10/1985 | Bopst, III | B60K 26/02 | 74/513 |
| 4,946,013 | A * | 8/1990 | Conlyn, Jr. | B60W 30/18 | 180/333 |
| 5,012,689 | A * | 5/1991 | Smith | B60W 30/18 | 200/317 |
| 5,394,743 | A * | 3/1995 | Noguchi | G01M 13/02 | 701/1 |
| 5,415,034 | A * | 5/1995 | Nishikawa | G01M 17/0074 | 73/115.01 |
| 5,553,684 | A * | 9/1996 | Bolduc | B60W 30/18 | 180/321 |
| 5,821,718 | A | 10/1998 | Shaffer et al. | | |
| 5,908,454 | A * | 6/1999 | Zyburt | G05D 1/0265 | 340/902 |
| 5,913,945 | A * | 6/1999 | Froelich | G05G 1/46 | 254/DIG. 5 |
| 5,991,674 | A * | 11/1999 | Froelich | G01M 17/0074 | 192/218 |
| 6,112,608 | A * | 9/2000 | Spravsow | F16H 59/02 | 24/514 |
| 6,141,603 | A * | 10/2000 | Greenhill | G01L 5/22 | 318/587 |
| 6,415,681 | B1 * | 7/2002 | Porter | G05G 1/305 | 192/13 R |
| 6,681,620 | B2 * | 1/2004 | Sakamoto | G01N 19/02 | 73/132 |
| 6,736,003 | B2 | 5/2004 | Takeda et al. | | |
| 7,628,239 | B1 * | 12/2009 | Louie | B62D 1/00 | 180/167 |
| 7,970,514 | B2 * | 6/2011 | Aeberhard | B60W 10/184 | 180/315 |
| 8,615,334 | B2 * | 12/2013 | Ewert | B60T 7/02 | 701/2 |
| 9,475,386 | B2 * | 10/2016 | Horiuchi | B60K 26/02 | |
| 9,501,083 | B2 * | 11/2016 | Zhou | F02D 11/02 | |
| 9,707,941 | B2 * | 7/2017 | Miao | B60T 7/06 | |
| 2005/0057087 | A1 | 3/2005 | Ahnafield | | |

OTHER PUBLICATIONS

"CBAR(Combined Brake and Accelerator robot)", MAGNUS, http://magus.co.kr/main/product_dep3.php?pro_idx=27 (2 pages).
"Driving Robots: Pedal Robots and Actuators", AB Dynamics, http://www.abd.uk.com/en/driving_robots/pedal_robots (3 pages).
"Robot: Target on Its Back", GPS World, http://gpsworld.com/robot-target-on-its-back/ (12 pages).

* cited by examiner

ACCELERATION AND BRAKING MECHANISM KIT FOR A VEHICLE

BACKGROUND

Vehicles, such as automobiles, military vehicles, airplanes, etc., may be autonomously controlled to accelerate, brake, and steer the vehicle. As one example, an automobile may be configured to be autonomous so that the acceleration and braking of the automobile may be remotely controlled during durability testing of the vehicle. Traditionally, the automobile is driven by a human test driver during durability testing. Durability testing may include a variety of tests that may be tedious and/or physically demanding on a human test driver. For example, durability testing may include tests that require driving the automobile over bumps, curbs, etc., which may be physically demanding on a human test driver.

To relieve the physical demand on the human test driver, the automobile may be autonomously operated during some tests of the durability testing. During such autonomous operation, the accelerator pedal and the brake pedal of the vehicle may be autonomously operated. For example, an autonomous control device may be connected to the accelerator pedal and the brake pedal for autonomous operation. However, several disadvantages are associated with such known autonomous control devices.

The installation of conventional autonomous control devices may be too time consuming to satisfy time constraints associated with durability testing. In addition, in some instances, e.g., between tests, during selected tests, etc., it is desired to manually operate the automobile by a human driver seated in the vehicle by operating the accelerator pedal and brake pedal with the feet of the human driver. However, removal of the known autonomous control device may be time consuming and unduly delay the durability testing. Further, the installation of the known autonomous control device may require modifications to the automobile that may invalidate the durability test results. The known autonomous control device may also lack satisfactory performance characteristics as a result of lack of responsiveness of components (known as "dead band"), device failure, etc.

As such, there remains an opportunity to design a mechanism that is quickly and easily installed/uninstalled from the vehicle and has satisfactory performance characteristics to autonomously operate the accelerator pedal and brake pedal of the vehicle.

DETAILED DESCRIPTION

Figure 1:
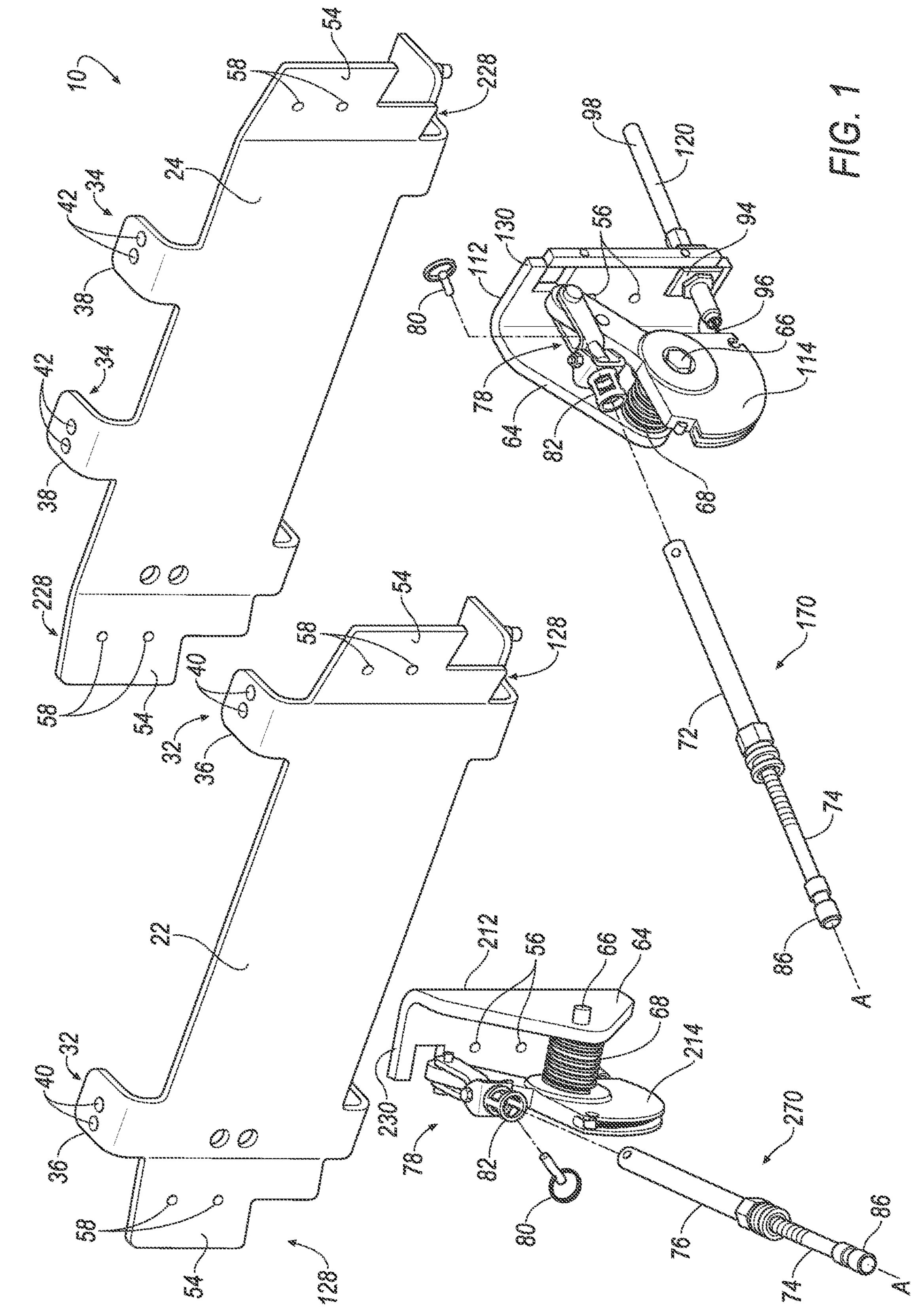
FIG. 1 is a perspective view of an acceleration and braking mechanism kit.
Figure 6:
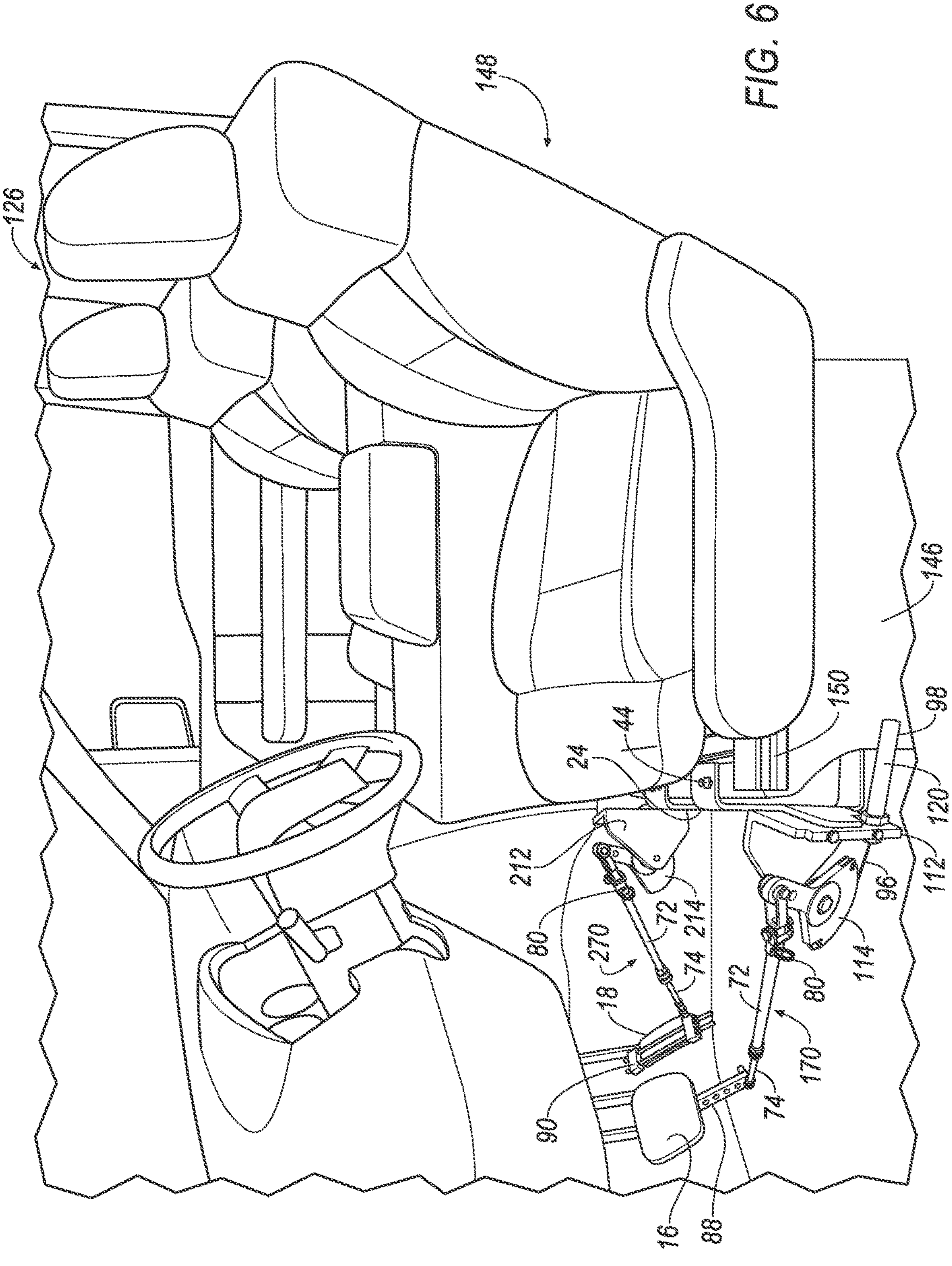
FIG. 6 is a perspective view of a portion of the kit installed in a second vehicle.

With reference to the Figures, wherein like numerals indicate like parts throughout the several views, an acceleration and braking mechanism kit 10 is generally shown in FIG. 1. The kit 10 includes a support bracket 112 and a bell crank 114 supported on the support bracket 112 for connection with one of a vehicle acceleration pedal 16 and a vehicle brake pedal 18. An actuator 120 is connected to the bell crank 114 for moving the bell crank 114. The kit 10 includes a first base bracket 22 configured to mount to a first vehicle 26 and a second base bracket 24 configured to mount to a second vehicle 126 (as shown in FIG. 6) different than the first vehicle 26. The first base bracket 22 and the second base bracket 24 each include a mounting feature 128. The support bracket 112 includes a mounting base 130 alternately engageable with the mounting feature 128 of the first base bracket 22 and the mounting feature 128 of the second base bracket 24.

Since the support bracket 112 is alternately engageable with both the mounting feature 128 of the first base bracket 22 and the mounting feature 128 of the second base bracket 24, the support bracket 112, the bell crank 114, and the actuator 120 are interchangeable between the first base bracket 22 and the second base bracket 24. As such, the first base bracket 22 may be mounted to the first vehicle 26 and the second base bracket 24 may be mounted to the second vehicle 126, and the support bracket 112, bell crank 114, and actuator 120 may be moved between the first base bracket 22 and the second base bracket 24, i.e., between the first vehicle 26 and the second vehicle 126. The first vehicle 26 and the second vehicle 126 may be different types, models, etc.

While FIG. 1 shows the kit 10 including the first base bracket 22 and the second base bracket 24, the kit 10 may include any suitable number of two or more base brackets each configured to mount to a different type of vehicle. As such, the kit 10 may be mounted to any type of vehicle for which a base bracket exists. For simplicity, only the first base bracket 22 and the second base bracket 24, and not additional base brackets, are discussed herein.

The kit 10 may be used to autonomously control the acceleration pedal 16 and the brake pedal 18 of the vehicle to which the kit 10 is mounted. For example, the vehicle may be an automobile, such as the first vehicle 26 shown in FIG. 1, and the kit 10 may be used to autonomously control the acceleration pedal 16 and the brake pedal 18 of the automobile during durability testing of the automobile. Alternatively, the kit 10 may be used to autonomously control any type of vehicle, e.g., an automobile, a military vehicle, an airplane, etc., in any type of use, e.g., testing, operation by a customer, etc.

Figure 2:
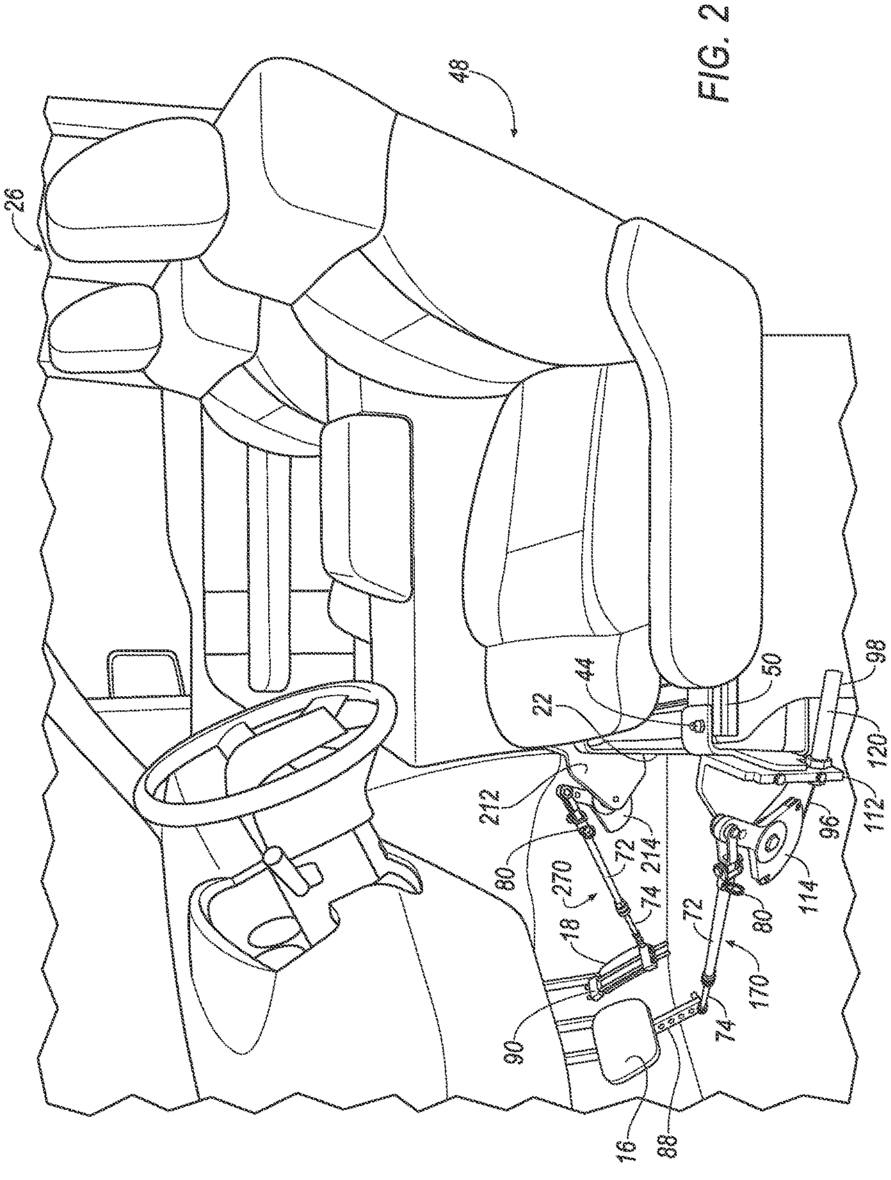
FIG. 2 is a perspective view of a portion of the kit installed in a first vehicle.
Figure 3:
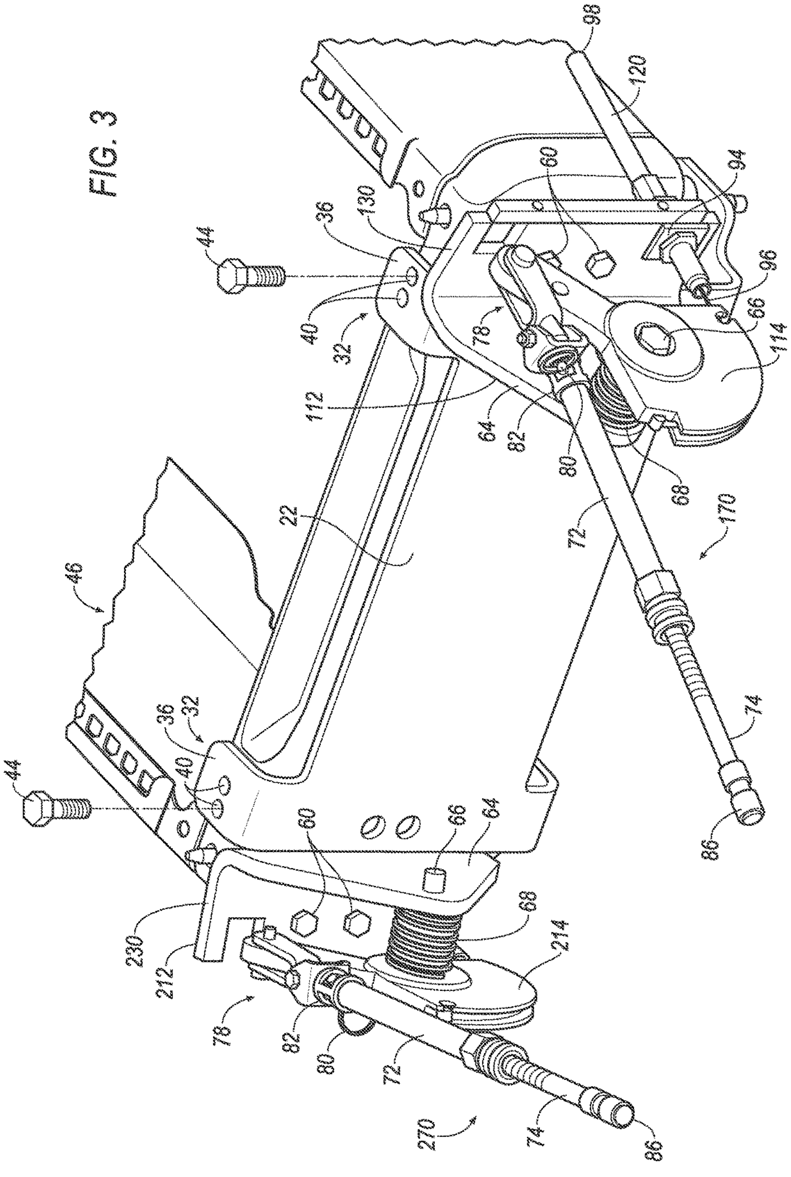
FIG. 3 is a magnified view of the portion of the kit of FIG. 2 and a portion of a seat to which the kit is mounted.
Figure 4:
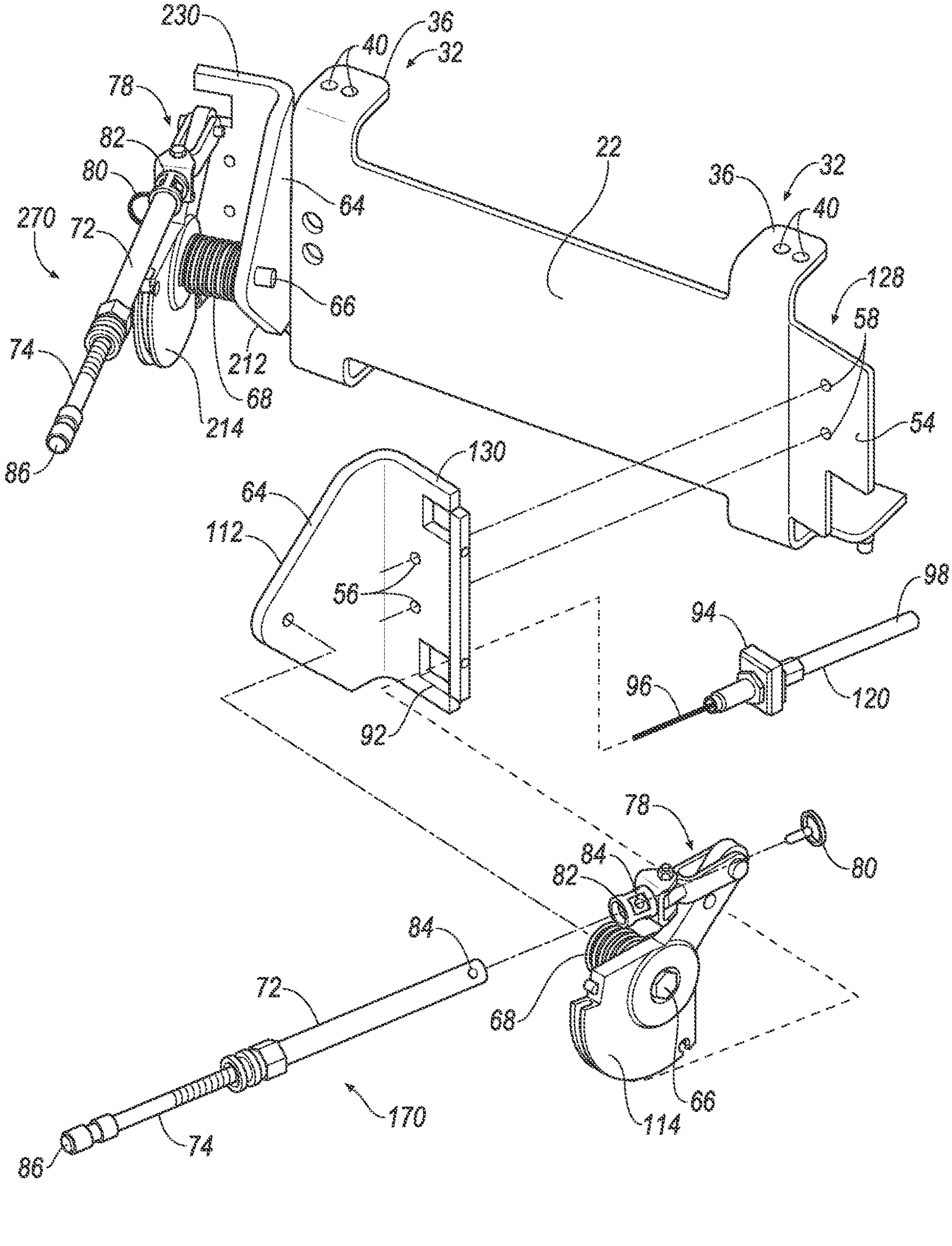
FIG. 4 is a partially exploded view of a portion of the kit.

The first base bracket 22 and the second base bracket 24 are shown in FIG. 1. The first base bracket 22 is shown in FIGS. 2-4 and is shown mounted to the first vehicle 26 in FIG. 2. The first base bracket 22 includes a first vehicle mounting feature 32 configured to mount to the first vehicle 26. The engagement of the first vehicle mounting feature 32 to the first vehicle 26 is shown in FIGS. 2 and 3. The second base bracket 24 includes a second vehicle mounting feature 34 different than the first vehicle mounting feature 32 and configured to mount to the second vehicle 126. In other words, the first vehicle 26 and the second vehicle 126 include different mounting features and the first base bracket 22 and the second base bracket 24, respectively, are configured to be mounted to the first vehicle 26 and the second vehicle 126.

With continued reference to FIG. 1, the first vehicle mounting feature 32 may include a flange 36 configured to engage the first vehicle 26, and the second vehicle mounting feature 34 may include a second flange 38 different than the flange 36 of the first vehicle mounting feature 32 and configured to engage the second vehicle 126. Specifically, the first vehicle mounting feature 32 may include a pair of flanges 36 spaced from each other and the second vehicle mounting feature 34 may include a pair of second flanges 38 spaced from each other.

Each of the flanges 36 and second flanges 38 may define holes 40, 42 for receiving fasteners 44, e.g., threaded fasteners, to connect the first base bracket 22 and the second base bracket 24, respectively, to the first vehicle 26 and the second vehicle 126, respectively. The flanges 36, 38 may be connected to a base 46 of a seat 48 of the vehicle, as shown in FIGS. 2 and 3. Specifically, the base 46 of the seat 48 of the first vehicle 26 may define holes (not shown) for receiving the fasteners 44 and a base 146 of a seat 148 of the second vehicle 126 may define holes for receiving the fasteners 44. The base 46 of the seat 48 of the first vehicle 26 has a different configuration than the base 146 of the seat 148 of the second vehicle 126 and, as such, the first base bracket 22 is configured to be mounted to the base 46 of the seat 48 of the first vehicle 26 and the second base bracket 24 is configured to be mounted to the base 146 of the seat 148 of the second vehicle 126.

The hole of the base 46, 146 of the seat 48, 148 of the first vehicle 26 and the second vehicle 126 may be the same hole to which a seat track 50 is connected with the fastener 44, as shown in FIG. 2. Accordingly, the first base bracket 22 and the second base bracket 24 may be mounted to the first vehicle 26 and second vehicle 126, respectively, with existing features of the base 46, 146 of the seat 48, 148. This allows for quick and easy installation of the first base bracket 22 and the second base bracket 24 and, when used during durability testing, avoids modifications that may invalidate the durability testing. The differences between the first vehicle mounting feature 32 and the second vehicle mounting feature 34 may include location of the flanges 36 and second flanges 38, spacing of the flanges 36 and second flanges 38, and/or location of the holes 40, 42.

As set forth above, the kit 10 includes the support bracket 112 and the bell crank 114 supported on the support bracket 112 for connection to one of the acceleration pedal 16 and the brake pedal 18. With reference to FIGS. 1-4, the kit 10 may include a second support bracket 212 and a second bell crank 214 supported on the second support bracket 212 for connection with the other of the acceleration pedal 16 and the brake pedal 18. As shown in FIG. 2, for example, the support bracket 112 is connected to the brake pedal 16 and the second support bracket 212 is connected to the acceleration pedal 18.

With continued reference to FIG. 1, as set forth above, the first base bracket 22 and the second base bracket 24 each include mounting features 128 and the support bracket 112 includes the mounting base 130 alternately engageable with the mounting features 128. Similarly, the first base bracket 22 and the second base bracket 24 may each include a second mounting feature 228, and the second support bracket 212 may include a mounting base 230 alternately engageable with the second mounting feature 228 of the first base bracket 22 and the second mounting feature 228 of the second base bracket 24. Each of the first base bracket 22 and the second base bracket 24 includes ears 54 configured to receive the support bracket 112 and the second support bracket 212, respectively.

The mounting bases 130 of the support bracket 112 includes holes 56. The mounting feature 128 of the first base bracket 22 includes holes 58 corresponding to holes 56 of the support bracket 112, and the mounting feature 228 of the second base bracket 24 includes holes 58 corresponding to holes 56 of the support bracket 112. The holes 56 of the support bracket 112 may be aligned with the holes 58 of the first base bracket 22 or the holes 58 of the second base bracket 24 to receive fasteners 60 to alternately engage the mounting base 130 to the first base bracket 22 and the second base bracket 24. The relative location of the holes 56 in the support bracket 112 match the relative location of the holes 58 in both the first base bracket 22 and the second base bracket 24 so that the support bracket 112 may be alternately engaged with the first base bracket 22 and the second base bracket 24.

Similarly, the mounting base 230 of the second support bracket 212 includes holes 56. The mounting feature 228 of the first base bracket 22 includes holes 58 corresponding to holes 56 of the second support bracket 212, and the mounting feature 228 of the second base bracket 24 includes holes 58 corresponding to holes 56 of the second support bracket 212. The holes 56 of the second support bracket 212 may be aligned with the holes 58 of the first base bracket 22 or the holes 58 of the second base bracket 24 to receive fasteners 60 to alternately engage the mounting base 230 to the first base bracket 22 and the second base bracket 24. The relative location of the holes 56 in the second support bracket 212 match the relative location of the holes 58 in both the first base bracket 22 and the second base bracket 24 so that the second support bracket 212 may be alternately engaged with the first base bracket 22 and the second base bracket 24. The holes 58 of the base brackets 22, 24 are defined in the ears 54. The mounting bases 130, 230 and the mounting features 128, 228 may include any suitable number of holes 56, 58.

The support brackets 112, 212 may each include the mounting base 130, 230 and a platform 64. The mounting base 130, 230 is configured to be mounted to the base brackets 22, 24. For example, the holes 56 are defined in the mounting base 130, 230. The platform 64 supports the bell crank 114, 214, as set forth further below.

With reference to FIGS. 1-4, the bell cranks 114, 214 are rotatably mounted to the support brackets 112, 212. A spindle 66 is supported on the support bracket 112, 212 with the bell crank 114, 214 supported on the spindle 66. Specifically, the spindle 66 may be fixed to the support bracket 112, 212 and the bell crank 114, 214 may be rotatably supported on the spindle 66.

With continued reference to FIGS. 1-4, a torsion spring 68 may be disposed on the spindle 66 between the bell crank 114, 214 and the support bracket 112, 212. The spindle 66 urges the bell crank 114, 214 to a position such that, absent force from the actuator 120, 220, the brake pedal 18 and the acceleration pedal 16 are not depressed by the kit 10.

A pusher 170 is connected to the bell crank 114 and a second pusher 270 is connected to the second bell crank 214. The pusher 170 and the second pusher 270 may have an identical construction. The pusher 170 extends from the bell crank 114 to the brake pedal 18. The second pusher 270 extends from the second bell crank 214 to the accelerator pedal 16.

The pusher 170 and second pusher 270 each include a cylinder 72 extending along an axis A and a rod 74 extending from the cylinder 72 along the axis A. The cylinder 72 may define a bore (not numbered) that receives the rod 74. The rod 74 is adjustable relative to the cylinder 72 along the axis A. For example, bore and the rod 74 may be threaded such that the rod 74 may be adjustable relative to the cylinder 72 by rotation.

The pushers 170, 270 may be mounted to the bell cranks 114, 214 with a universal joint 78 that allows for rotation of the pushers 170, 270 in multiple degrees of freedom. Alternatively, the pushers 170, 270 may be mounted to the bell cranks 114, 214 in any suitable manner.

The pushers 170, 270 may be removably connected to the bell cranks 114, 214. Specifically, a pin 80 removably connects the pusher 170, 270 to bell crank 114, 214. The universal joint 78 may define a cup 82 that receives the cylinder 72 of the pusher 170, 270. The cylinder 72 of the pusher 170, 270 and the cup 82 may each define a hole 84 that removably receives the pin 80. When engaged in the holes 84, the pin 80 retains the pusher 170, 270 to the universal joint 78. The cylinder 72 may be removed from the cup 82 when the pin 80 is removed from the holes 84.

As shown in FIGS. 1, 3, and 4, the rod 74 of the pusher 170, 270 includes an end 86 spaced from the cylinder 72. The ends 86 may directly contact the brake pedal 18 and the accelerator pedal 16 to depress the brake pedal 18 and the accelerator pedal 16. Alternatively, or in addition, an extension 88 may be mounted to one of the brake pedal 18 and the accelerator pedal 16, and the end 86 may be fixed to the extension 88. The end 86 may be quickly and easily connected and disconnected with the extension 88, e.g., with a pin (not numbered) that engages the end 86 and the extension 88. A cotter pin or other suitable connector may connect the pin to the extension 88. The extension 88, for example, is mounted to the brake pedal 18 in FIG. 2. Alternatively, a clamp 90 may be mounted to one of the brake pedal 18 and the accelerator pedal 16 and the end 86 may be fixed to the clamp 90. The end 86 may be quickly and easily connected and disconnected with the clamp 90, e.g., with a pin (not shown) that engages the end 86 and the clamp 90. A cotter pin or other suitable connector may connect the pin to the clamp 90. The clamp 90, for example, is mounted to the accelerator pedal 16 in FIG. 2.

As set forth above, the actuator 120 is connected to the bell crank 114. A second actuator 240 connected to the second bell crank 214 for moving the second bell crank 214. The actuators 120, 220 may be supported by the support brackets 112, 212. For example, as shown in FIG. 4, the support brackets 112, 212 may define cutouts 92 and the actuators 120, 220 may include plates 94 that engage the cutouts 92.

The actuators 120, 220 may be linear actuators, each including a cable 96 connected to the bell cranks 114, 214 and a mechanism 98 connected to the cable 96 for extending and retracting the cable 96. The mechanisms 98 are supported by the support brackets 112, 212. The linear actuator may be of any type, for example, electro-mechanical, hydraulic, pneumatic, etc. The electro-mechanical linear actuator, for example, may include a lead nut (not shown) attached to a motor (not shown) and a rod (not shown) threadedly engaged with the lead nut. The rod is connected to the cable 96 such that, when the nut is rotated by the motor, the rod pulls the cable 96 into the actuator 120, 220 or feeds the cable 96 out of the actuator 120, 220.

The kit 10 may include a control system in communication with actuator 120, 220 for controlling the actuator 120, 220. The control system may remotely the actuator 120, 220 or at least a portion of the control system may be connected to the actuator 120, 220 with a wired connection.

In operation, the kit 10 may be alternately assembled to a plurality of vehicles. For example, the first base bracket 22 may be mounted to the first vehicle 26, the second base bracket 24 may be mounted to the second vehicle 126, and additional base brackets may be mounted to additional vehicles. As one example, the first base bracket 22 may be mounted to the base 46 of the seat 48 of the first vehicle 26 and the second base bracket 24 may be mounted to the base 146 of the seat 148 of the second vehicle 126, as set forth above. To autonomously operate the first vehicle 26, the support bracket 112 and the second support bracket 212 may be mounted to the first base bracket 22, as set forth above, and the pusher 170 and the second pusher 270 are engaged with the brake pedal 18 and the accelerator pedal 16 of the first vehicle 26. In such a configuration, the actuators 120, 220 may be actuated by the control system to autonomously control the accelerator pedal 16 and the brake pedal 18 of the first vehicle 26.

If an operator of the first vehicle 26 desires to manually operate the accelerator pedal 16 and the brake pedal 18, i.e., operation by foot, the pins 80 may be removed from the pushers 170, 270 to disengage the pushers 170, 270 from the bell cranks 114, 214, and the pins at the ends 86 of the pushers 170, 270 may be disengaged with the brake pedal 18 and the accelerator pedal 16, respectively, to remove the pushers 170, 270. In such a configuration, the operator may have access to the accelerator pedal 16 and the brake pedal 18 for operation by foot.

To autonomously operate the second vehicle 126, the support bracket 112 and the second support bracket 212 may be removed from the first base bracket 22 and mounted to the second base bracket 24, as set forth above, and the pusher 170 and the second pusher 270 are engage engaged with the brake pedal 18 and the accelerator pedal 16 of the second vehicle 126. In such a configuration, the actuators 120, 220 may be actuated by the control system to autonomously control accelerator pedal 16 and brake pedal 18 of the second vehicle 126.

Figure 5:
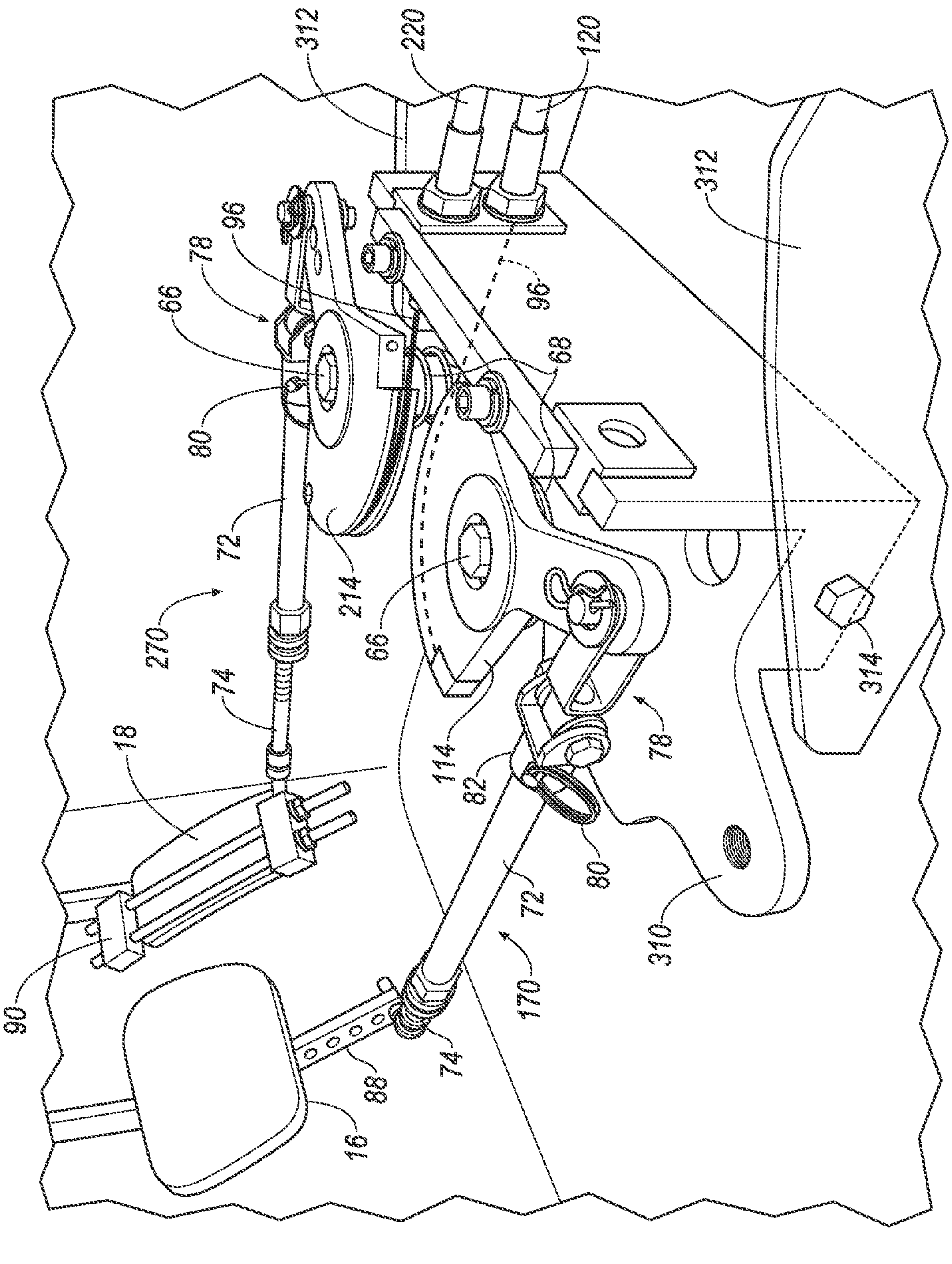
FIG. 5 is a perspective view of a portion of a second embodiment of the kit.

A second embodiment of the kit 10 is shown in FIG. 5. Common numerals are used to identify common elements in FIGS. 1-4 and in FIG. 5, and the description of elements described above, with reference to FIGS. 1-4, is applicable to the elements with common numerals in FIG. 5. The bell cranks 114, 214 of FIGS. 1-4 are vertically oriented and the bell cranks 114, 214 of FIG. 5 are horizontally oriented.

With reference to FIG. 5, the bell cranks 114, 214 are both supported on a single support bracket 310. The kit 10 includes at least one first base bracket 312. Specifically, as shown in FIG. 5, the kit 10 includes a pair of first base brackets 312 spaced from each other with the single support bracket 310 extending between and removably coupled to the first base brackets 312.

The first base brackets 312 are configured to mount to a first vehicle (not shown). In FIG. 5, only the pair of first base brackets 312 are shown. However, it should be appreciated that the kit 10 includes second base brackets (not shown) configured to mount to a second vehicle 126 and any other number of base brackets for mounting to any number of different types of vehicles. The single support bracket 310 is configured to be removably connected to each of the base brackets 312 such that the single support bracket 310 may be interchangeable between different vehicles.

The pair of first base brackets 312 may be connected to the base of the seat (not shown in FIG. 5). The single support bracket 310 may be fixed to the first base brackets 312 with a threaded fastener 314 that engages the support bracket 31 and one of the first base brackets 312.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An acceleration and braking mechanism kit comprising: a support bracket;

a bell crank supported on the support bracket for connection with one of a vehicle acceleration pedal and a vehicle brake pedal;

an actuator connected to the bell crank for moving the bell crank;

a first base bracket mountable to a first vehicle; and a second base bracket mountable to a second vehicle different than the first vehicle;

the first base bracket and the second base bracket each including a mounting feature, the support bracket including a mounting base alternately engageable with the mounting feature of the first base bracket or the mounting feature of the second base bracket;

wherein the first base bracket includes a first vehicle mounting feature mountable to the first vehicle, and the second base bracket includes a second vehicle mounting feature different than the first mounting feature and mountable to the second vehicle; and wherein the first vehicle mounting feature includes a pair of flanges engageable with the first vehicle, and the second vehicle mounting feature includes a pair of second flanges engageable with the second vehicle, wherein a distance between the pair of flanges is different than a distance between the pair of second flanges, wherein each of the pair of flanges and each of the pair of second flanges includes a hole, and wherein a distance between the holes of the pair of flanges is different than a distance between the holes of the pair of second flanges.

2. The kit as set forth in claim 1 further comprising a pusher connected to the bell crank for placement between the bell crank and the one of the acceleration pedal and the brake pedal.

3. The kit as set forth in claim 2 further comprising a pin removably connecting the pusher to the bell crank.

4. The kit as set forth in claim 2 wherein the pusher includes a cylinder and a rod extending from the cylinder along the axis and being adjustable relative to the cylinder along the axis.

5. The kit as set forth in claim 1 further comprising a torsion spring between the bell crank and the support bracket.

6. The kit as set forth in claim 1 wherein the first vehicle mounting feature includes a flange engageable with the first vehicle and the second vehicle mounting feature includes a second flange different than the flange of the first bracket and engageable with the second vehicle.

7. The kit as set forth in claim 6 wherein the flanges of the first bracket and the second bracket each include a hole for receiving a fastener to engage the vehicle.

8. The kit as set forth in claim 1 further comprising a control system in communication with actuator for controlling the actuator.

9. The kit as set forth in claim 1 wherein the mounting base of the support bracket includes holes and the mounting features of the first bracket and the second bracket include corresponding holes for receiving fasteners to engage the mounting base to alternately engage the support bracket to the first bracket or the second bracket.

10. The kit as set forth in claim 1 further comprising a spindle supported on the support bracket with the bell crank supported on the spindle.

11. The kit as set forth in claim 1 wherein the actuator is a linear actuator including a cable connected to the bell crank and a mechanism connected to the cable for extending and retracting the cable.

12. The kit as set forth in claim 11 wherein the mechanism is supported on the support bracket.

13. The kit as set forth in claim 1 further comprising a second support bracket and a second bell crank supported on the second support bracket for connection with the other of the acceleration pedal and the brake pedal of the vehicle.

14. The kit as set forth in claim 13 wherein the first base bracket and the second base bracket each include a second mounting feature and wherein the second support bracket includes a mounting base alternately engageable with the second mounting feature of the first base bracket or the second mounting feature of the second base bracket.

15. The kit as set forth in claim 14 further comprising a second actuator connected to the second bell crank for moving the second bell crank.

16. A system comprising:

a first vehicle and a second vehicle;

a support bracket;

a bell crank supported on the support bracket;

an actuator connected to the bell crank;

a first base bracket including a first vehicle mounting feature mounted to the first vehicle;

a second base bracket including a second vehicle mounting feature different than the first vehicle mounting feature, the second vehicle mounting feature being mounted to the second vehicle;

the first base bracket and the second base bracket each including a mounting feature, the support bracket including a mounting base alternately engageable with the mounting feature of the first base bracket or the mounting feature of the second base bracket; and wherein the first vehicle mounting feature includes a pair of flanges, and the second vehicle mounting feature includes a pair of second flanges, wherein a distance between the pair of flanges is different than a distance between the pair of second flanges, wherein each of the pair of flanges and each of the pair of second flanges includes a hole, wherein a distance between the holes of the pair of flanges is different than a distance between the holes of the pair of second flanges, and wherein fasteners connect the first base bracket to the first vehicle through the holes in the pair of flanges and connect the second base bracket to the second vehicle through the holes in the pair of second flanges.

17. The system as set forth in claim 16 wherein the first vehicle includes a seat having a base, and the second vehicle includes a seat having a base having a different configuration than the base of the seat of the first vehicle, the pair of flanges of the first vehicle mounting feature being mounted to the base of the seat of the first vehicle, and the pair of second flanges of the second vehicle mounting feature being mounted to the base of the seat of the second vehicle.

18. The system as set forth in claim 16 wherein the mounting base of the support bracket includes holes and the mounting features of the first bracket and the second bracket include holes aligned with the holes in the mounting base of the support bracket for receiving fasteners to engage the mounting base to alternately engage the support bracket to the first bracket or the second bracket.

* * * * *